United States Patent
Hidaka et al.

(10) Patent No.: US 8,957,325 B2
(45) Date of Patent: Feb. 17, 2015

(54) OPTIMIZED VIA CUTOUTS WITH GROUND REFERENCES

(71) Applicant: Fujitsu Limited, Kanagawa (JP)

(72) Inventors: Yasuo Hidaka, Cupertino, CA (US); Pradip Thachile, San Jose, CA (US)

(73) Assignee: Fujitsu Limited, Kawasaki-shi (JP)

( * ) Notice: Subject to any disclaimer, the term of this patent is extended or adjusted under 35 U.S.C. 154(b) by 207 days.

(21) Appl. No.: 13/742,168

(22) Filed: Jan. 15, 2013

(65) Prior Publication Data

US 2014/0196941 A1    Jul. 17, 2014

(51) Int. Cl.
- H05K 1/11         (2006.01)
- G06F 17/50        (2006.01)
- H05K 1/02         (2006.01)

(52) U.S. Cl.
CPC ............. H05K 1/116 (2013.01); G06F 17/50 (2013.01); H05K 1/0245 (2013.01); H05K 1/0251 (2013.01); H05K 1/0225 (2013.01); H05K 1/0253 (2013.01); H05K 2201/09718 (2013.01); H05K 2201/09727 (2013.01)
USPC ............................................. 174/262; 29/852

(58) Field of Classification Search
USPC ................... 174/262–266, 255; 361/792–795; 29/852–853
See application file for complete search history.

(56) References Cited

U.S. PATENT DOCUMENTS

| | | |
|---|---|---|
| 4,494,083 A | 1/1985 | Josefsson et al. |
| 4,839,497 A | 6/1989 | Sankar et al. |
| 5,184,095 A | 2/1993 | Hanz et al. |
| 5,336,855 A | 8/1994 | Kahlert et al. |
| 5,387,888 A | 2/1995 | Eda et al. |
| 5,389,735 A | 2/1995 | Bockelman |
| 5,397,862 A | 3/1995 | Bockelman et al. |
| 5,430,247 A | 7/1995 | Bockelman |
| 5,486,655 A | 1/1996 | Arike et al. |
| 5,510,580 A | 4/1996 | Shirai et al. |
| 5,584,121 A | 12/1996 | Arike et al. |
| 6,075,423 A | 6/2000 | Saunders |
| 6,121,553 A | 9/2000 | Shinada et al. |
| 6,229,095 B1 | 5/2001 | Kobayashi |
| 6,329,604 B1 | 12/2001 | Koya |
| 6,353,999 B1 | 3/2002 | Cheng |

(Continued)

FOREIGN PATENT DOCUMENTS

| | | | |
|---|---|---|---|
| JP | 1013796 | 1/1989 | ............... H05K 3/46 |
| JP | 1154869 | 6/1989 | ............... B23K 9/00 |

(Continued)

*Primary Examiner* — Jeremy C Norris

(74) *Attorney, Agent, or Firm* — Baker Botts L.L.P.

(57) ABSTRACT

The present disclosure relates to a method of optimizing via cutouts, including selecting a geometry of a via cutout on a first ground reference layer adjacent to a first differential trace, the geometry selected to provide an extension region extending in the direction of the first differential trace. Additionally, the method includes the steps of selecting a geometry of the first differential trace, wherein a spacing of the first differential trace in the extension region is different from a spacing of the first differential trace outside the extension region, and selecting a radial dimension of a first and second via cutout on a second ground reference layer adjacent to and between the first and second differential traces, the radial dimension of the first via cutout and the second via cutout selected such that the second ground reference layer remains intact in the area adjacent the second differential trace.

18 Claims, 4 Drawing Sheets

(56) References Cited

U.S. PATENT DOCUMENTS

| | | |
|---|---|---|
| 6,377,141 B1 | 4/2002 | Hirabayashi |
| 6,392,164 B1 | 5/2002 | Iwaki et al. |
| 6,396,000 B1 | 5/2002 | Baum |
| 6,400,234 B1 | 6/2002 | Ohhashi et al. |
| 6,407,345 B1 | 6/2002 | Hirose et al. |
| 6,486,755 B2 | 11/2002 | Aruga |
| 6,541,712 B1 | 4/2003 | Gately et al. |
| 6,630,627 B1 | 10/2003 | Tobita |
| 6,677,831 B1 | 1/2004 | Cheng et al. |
| 6,677,839 B2 | 1/2004 | Aruga |
| 6,700,457 B2 | 3/2004 | McCall et al. |
| 6,787,710 B2 | 9/2004 | Uematsu et al. |
| 6,812,803 B2 | 11/2004 | Goergen |
| 6,856,210 B2 | 2/2005 | Zhu et al. |
| 6,969,808 B2 | 11/2005 | Shiraki |
| 6,972,380 B2 | 12/2005 | Lee |
| 6,980,068 B2 | 12/2005 | Miyazawa et al. |
| 6,995,322 B2 | 2/2006 | Chan et al. |
| 7,030,712 B2 | 4/2006 | Brunette et al. |
| 7,034,544 B2 | 4/2006 | Ye et al. |
| 7,047,628 B2 | 5/2006 | Lee |
| 7,168,164 B2 | 1/2007 | Jessep et al. |
| 7,187,249 B2 | 3/2007 | Nicholson et al. |
| 7,204,018 B2 | 4/2007 | Kwong et al. |
| 7,230,835 B1 | 6/2007 | Ahmad |
| 7,249,337 B2 | 7/2007 | Gisin et al. |
| 7,271,681 B2 | 9/2007 | Dyckman et al. |
| 7,326,856 B2 | 2/2008 | Takada |
| 7,339,260 B2 | 3/2008 | Sugimoto et al. |
| 7,348,932 B1 | 3/2008 | Puzella et al. |
| 7,385,470 B2 | 6/2008 | Kwong et al. |
| 7,394,337 B2 | 7/2008 | Arai et al. |
| 7,409,668 B2 | 8/2008 | Lin et al. |
| 7,435,912 B1 | 10/2008 | Alexander et al. |
| 7,436,268 B2 | 10/2008 | Jiang et al. |
| 7,443,265 B2 | 10/2008 | Hsu et al. |
| 7,446,624 B2 | 11/2008 | Kashiwakura |
| 7,448,880 B2 | 11/2008 | Osaka |
| 7,457,132 B2 | 11/2008 | Gisin et al. |
| 7,492,146 B2 | 2/2009 | Behziz |
| 7,501,586 B2 | 3/2009 | Wig et al. |
| 7,525,190 B2 | 4/2009 | Hirose et al. |
| 7,594,105 B2 | 9/2009 | Ohsaka |
| 7,615,709 B2 | 11/2009 | Goergen |
| 7,652,896 B2 | 1/2010 | Chheda et al. |
| 7,676,919 B2 | 3/2010 | Zhao et al. |
| 7,676,920 B2 | 3/2010 | Farkas et al. |
| 7,688,594 B2 | 3/2010 | Muto et al. |
| 7,705,246 B1 | 4/2010 | Pritchard et al. |
| 7,705,695 B2 | 4/2010 | Kushta |
| 7,709,747 B2 | 5/2010 | Morlion et al. |
| 7,868,257 B2 | 1/2011 | Kushta et al. |
| 7,897,880 B1 | 3/2011 | Goergen et al. |
| 7,921,403 B2 | 4/2011 | Dangler et al. |
| 7,940,144 B2 | 5/2011 | Koch et al. |
| 7,948,070 B2 | 5/2011 | Chuang et al. |
| 7,992,297 B2 | 8/2011 | Zhao et al. |
| 8,158,892 B2 | 4/2012 | Goergen et al. |
| 8,227,709 B2 | 7/2012 | Tsubamoto |
| 2001/0015288 A1 | 8/2001 | Dove et al. |
| 2001/0054939 A1 | 12/2001 | Zhu et al. |
| 2002/0170744 A1 | 11/2002 | Morris |
| 2004/0150970 A1 | 8/2004 | Lee |
| 2004/0263181 A1 | 12/2004 | Ye et al. |
| 2005/0029013 A1 | 2/2005 | Lee |
| 2005/0039950 A1 | 2/2005 | Chan et al. |
| 2005/0083148 A1 | 4/2005 | Hsu |
| 2005/0091440 A1 | 4/2005 | Isa et al. |
| 2005/0133251 A1 | 6/2005 | Chiu |
| 2005/0146390 A1 | 7/2005 | Baek |
| 2005/0231927 A1 | 10/2005 | Masuyama et al. |
| 2006/0043572 A1 | 3/2006 | Sugimoto et al. |
| 2006/0130321 A1 | 6/2006 | Kwong et al. |
| 2006/0158280 A1 | 7/2006 | Jow et al. |
| 2006/0164179 A1 | 7/2006 | Arai et al. |
| 2006/0185890 A1 | 8/2006 | Robinson |
| 2006/0226928 A1 | 10/2006 | Henning et al. |
| 2006/0231833 A1 | 10/2006 | Winings et al. |
| 2006/0232301 A1 | 10/2006 | Morlion et al. |
| 2006/0237227 A1 | 10/2006 | Zhao et al. |
| 2006/0243479 A1 | 11/2006 | Kim et al. |
| 2007/0007031 A1 | 1/2007 | Zhao et al. |
| 2007/0018751 A1 | 1/2007 | Hsu et al. |
| 2007/0018752 A1 | 1/2007 | Miller |
| 2007/0103251 A1 | 5/2007 | Fan et al. |
| 2007/0125574 A1 | 6/2007 | Kim et al. |
| 2007/0130555 A1 | 6/2007 | Osaka |
| 2007/0132527 A1 | 6/2007 | Chen |
| 2007/0169961 A1 | 7/2007 | Kwong et al. |
| 2007/0205847 A1 | 9/2007 | Kushta et al. |
| 2007/0217168 A1 | 9/2007 | Masuyama et al. |
| 2007/0217173 A1 | 9/2007 | Mizutani et al. |
| 2007/0289771 A1 | 12/2007 | Osaka et al. |
| 2008/0121421 A1 | 5/2008 | Kashiwakura |
| 2008/0135281 A1 | 6/2008 | Zhang et al. |
| 2008/0223603 A1 | 9/2008 | Kim et al. |
| 2008/0227312 A1 | 9/2008 | Ogata et al. |
| 2008/0278259 A1 | 11/2008 | Ni |
| 2008/0290474 A1 | 11/2008 | Chun et al. |
| 2009/0015345 A1 | 1/2009 | Kushta et al. |
| 2009/0049414 A1 | 2/2009 | Mutnury et al. |
| 2009/0056999 A1 | 3/2009 | Kashiwakura |
| 2009/0229866 A1 | 9/2009 | Oyamada |
| 2009/0294169 A1 | 12/2009 | Tsubamoto et al. |
| 2010/0033262 A1 | 2/2010 | Puzella et al. |
| 2010/0041256 A1 | 2/2010 | Morlion et al. |
| 2010/0041275 A1 | 2/2010 | Morlion et al. |
| 2010/0044095 A1 | 2/2010 | Kuczynski et al. |
| 2010/0048043 A1 | 2/2010 | Morlion et al. |
| 2010/0066631 A1 | 3/2010 | Puzella et al. |
| 2010/0071939 A1 | 3/2010 | Cheng et al. |
| 2010/0126010 A1 | 5/2010 | Puzella et al. |
| 2010/0259338 A1 | 10/2010 | Jow et al. |
| 2010/0289596 A1 | 11/2010 | Makino et al. |
| 2010/0314163 A1 | 12/2010 | Twardy et al. |
| 2011/0025429 A1 | 2/2011 | Syal |
| 2011/0120751 A1 | 5/2011 | Shih et al. |

FOREIGN PATENT DOCUMENTS

| | | | |
|---|---|---|---|
| JP | 3155901 | 7/1991 | B27D 1/04 |
| JP | 4123601 | 4/1992 | H01Q 1/46 |
| JP | 4172427 | 6/1992 | G02F 1/37 |
| JP | 4259311 | 9/1992 | B22F 9/08 |
| JP | 4296864 | 10/1992 | G03G 5/02 |
| JP | 4367660 | 12/1992 | A61G 17/00 |
| JP | 4371065 | 12/1992 | G03B 27/50 |
| JP | 5093080 | 4/1993 | B32B 27/36 |
| JP | 5160605 | 6/1993 | H01P 3/08 |
| JP | 5206591 | 8/1993 | H05K 1/02 |
| JP | 6013181 | 1/1994 | H01L 51/50 |
| JP | 6038554 | 5/1994 | H05K 1/02 |
| JP | 6287484 | 10/1994 | C09D 163/00 |
| JP | 7106759 | 4/1995 | H01P 3/08 |
| JP | 8307056 | 11/1996 | H01L 21/768 |
| JP | 9199863 | 7/1997 | H05K 1/02 |
| JP | 9246729 | 9/1997 | H05K 1/02 |
| JP | 10093215 | 4/1998 | H05K 1/11 |
| JP | 11067969 | 3/1999 | H01L 23/12 |
| JP | 11150371 | 6/1999 | H05K 1/02 |
| JP | 11340590 | 12/1999 | H05K 1/02 |
| JP | 200020887 | 7/2000 | H05K 1/02 |
| JP | 2000188478 | 7/2000 | H05K 3/46 |
| JP | 2000216510 | 8/2000 | H05K 1/02 |
| JP | 2000252716 | 9/2000 | H01P 11/00 |
| JP | 200144716 | 2/2001 | H01P 5/08 |
| JP | 2001102755 | 4/2001 | H05K 3/46 |
| JP | 2001230508 | 8/2001 | H05K 1/11 |
| JP | 2001267703 | 9/2001 | H05K 1/02 |
| JP | 2001308547 | 11/2001 | H05K 3/46 |
| JP | 2002076802 | 3/2002 | H03F 3/24 |
| JP | 2002141711 | 5/2002 | H01P 5/08 |
| JP | 2003046247 | 2/2003 | H05K 3/06 |
| JP | 2003110311 | 4/2003 | H01P 1/203 |

(56) References Cited

FOREIGN PATENT DOCUMENTS

| | | | | |
|---|---|---|---|---|
| JP | 2003258403 | 9/2003 | | H05K 1/14 |
| JP | 2003283093 | 10/2003 | | H01R 12/04 |
| JP | 2004014800 | 1/2004 | | H01P 3/08 |
| JP | 2004241680 | 8/2004 | | H05K 3/46 |
| JP | 2004265981 | 9/2004 | | H01L 23/12 |
| JP | 2004265982 | 9/2004 | | H01L 23/12 |
| JP | 2004304401 | 10/2004 | | H01L 1/04 |
| JP | 2004363975 | 12/2004 | | H01L 23/12 |
| JP | 2005026549 | 1/2005 | | H05K 3/46 |
| JP | 2005116945 | 4/2005 | | B23B 41/00 |
| JP | 2005135453 | 5/2005 | | G11C 5/00 |
| JP | 2005197720 | 7/2005 | | H05K 3/46 |
| JP | 2005236064 | 9/2005 | | H01L 23/12 |
| JP | 2005277028 | 10/2005 | | H01P 3/08 |
| JP | 2006005050 | 1/2006 | | G06F 17/50 |
| JP | 2006005052 | 1/2006 | | H05K 3/46 |
| JP | 2006049645 | 2/2006 | | H01L 23/12 |
| JP | 2006066507 | 3/2006 | | H05K 1/16 |
| JP | 2006140365 | 6/2006 | | H01P 5/02 |
| JP | 2006179551 | 7/2006 | | H01L 23/12 |
| JP | 2006211070 | 8/2006 | | H01P 5/02 |
| JP | 2006245291 | 9/2006 | | H05K 1/02 |
| JP | 2007035710 | 2/2007 | | H05K 3/46 |
| JP | 2007035799 | 2/2007 | | H05K 3/46 |
| JP | 2007142307 | 6/2007 | | H05K 3/46 |
| JP | 2007250818 | 9/2007 | | H05K 3/46 |
| JP | 2007258358 | 10/2007 | | H05K 1/02 |
| JP | 2008064780 | 3/2008 | | G02F 1/133 |
| JP | 2008507858 | 3/2008 | | H01P 7/04 |
| JP | 2008091707 | 4/2008 | | H01P 1/20 |
| JP | 2008518486 | 5/2008 | | H05K 3/46 |
| JP | 2008130976 | 6/2008 | | H05K 3/46 |
| JP | 2008205099 | 9/2008 | | H05K 1/11 |
| JP | 2008211240 | 9/2008 | | H05K 1/02 |
| JP | 2008270239 | 11/2008 | | H05K 1/02 |
| JP | 200959873 | 3/2009 | | H05K 3/46 |
| JP | 2009528693 | 8/2009 | | H05K 3/46 |
| JP | 2009289981 | 12/2009 | | H05K 3/46 |
| JP | 2010087037 | 4/2010 | | H05K 1/02 |
| JP | 2010093018 | 4/2010 | | H01L 23/12 |
| JP | 2010182982 | 8/2010 | | H05K 3/46 |
| JP | 2010537402 | 12/2010 | | H05K 3/46 |
| JP | 2011035525 | 2/2011 | | G06F 1/18 |
| JP | 2011066101 | 3/2011 | | H05K 1/02 |
| JP | 2011091141 | 5/2011 | | H05K 1/02 |

OPTIMIZED VIA CUTOUTS WITH GROUND REFERENCES

TECHNICAL FIELD

The disclosure relates generally to printed circuit boards having optimized via cutouts.

BACKGROUND

Modern printed circuit boards (PCBs) have multiple metal layers sandwiched between layers of a dielectric material. Some of the metal layers are reserved for grounding, while others are reserved for signal transmission. The layers reserved for signal transmission include a thin metal layer, most of which is removed by etching, leaving only thin, narrow traces. The layers reserved for grounding may also include a thin metal layer, most of which remains intact. A plated through-hole is used to provide an electrical connection between a trace on one layer of the PCB and a trace on another layer. To prevent an electrical connection between the grounding layers and the vias, the grounding layer is removed in an area surrounding the via. These areas are known as via cutouts or antipads. Typically, large oval-shaped via cutouts, which remove all the metal between a pair of vias, are used to improve the electrical performance of a signal. The use of such large via cutouts on a grounding layer, however, may cause an overlap between a via cutout and a trace on an adjacent layer. This overlap may create an electrical interaction between the overlapping via cutout and trace, which is referred to as discontinuity. Such discontinuity negatively impacts the electrical performance of the signal transmission.

SUMMARY

In accordance with the teachings of the present disclosure, a method of optimizing via cutouts on a printed circuit board (PCB) is provided, which substantially eliminates or reduces disadvantages and problems associated with previous methods.

In accordance with one aspect of the present disclosure, a geometry of a via cutout on a first ground reference layer adjacent to a first differential trace may be selected to provide an extension region extending in the direction of the first differential trace. Additionally, a geometry of the first differential trace may be selected, wherein a spacing of the first differential trace in the extension region is different from a spacing of the first differential trace outside the extension region. Further, a radial dimension of a first via cutout and a second via cutout on a second ground reference layer may be selected such that the second ground reference layer remains intact in the area adjacent the second differential trace, wherein the second ground reference layer is adjacent to and between the first differential trace and the second differential trace.

In accordance with another aspect of the present disclosure, if a printed circuit board includes a third ground reference layer adjacent to and between the second differential trace and a third differential trace, a radial dimension of a first via cutout and a second via cutout on the third ground reference layer may be selected such that the third ground reference layer remains intact in the area adjacent the third differential trace.

In accordance with yet another aspect of the present disclosure, if a printed circuit board includes a third ground reference layer adjacent to the second differential trace, but not between the second differential trace and a third differential trace, a geometry of a via cutout on the third ground reference layer may be selected to provide an extension region extending in the direction of the second differential trace. Additionally, a geometry of the second differential trace may be selected, wherein a spacing of the second differential trace in the extension region is different from a spacing of the second differential trace outside the extension region.

The objects and advantages of the present disclosure will be realized and attained at least by the elements, features, and combinations particularly pointed out in the claims. It is to be understood that both the foregoing general description and the following detailed description are exemplary and explanatory and are not restrictive of the disclosed subject matter, as claimed.

DETAILED DESCRIPTION OF THE INVENTION

Particular embodiments and their advantages are best understood by reference to FIGS. 1 through 8, wherein like numbers are used to indicate like and corresponding parts.

Figure 1:
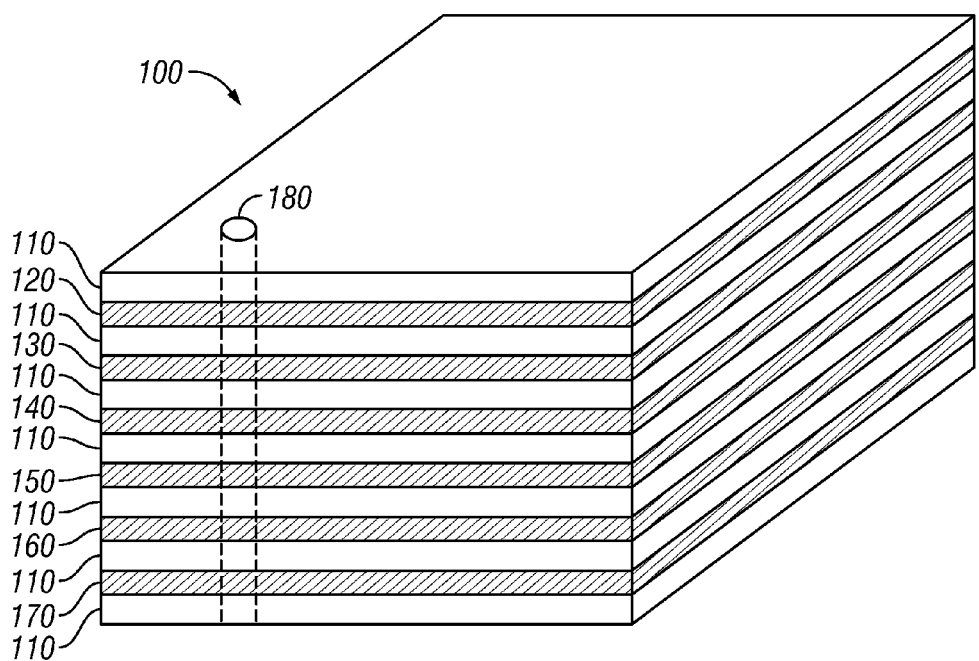
FIG. 1 illustrates a printed circuit board in accordance with one embodiment of the present disclosure.

The teachings of this disclosure may be used to optimize via cutouts on a printed circuit board (PCB) in order to improve the electrical performance of signal traces. As shown in FIG. 1, a PCB 100 may include alternating layers of dielectric material 110 and metal 120, 130, 140, 150, 160, and 170. Metal layers 120, 130, 140, 150, 160, and 170 may include copper or any other suitable material. Some of the metal layers may be reserved for grounding, while others may be reserved for signal transmission. For example, the PCB 100 may include ground reference layers 120, 140, and 160. Additionally, the PCB 100 may include signal transmission layers 130, 150, and 170. A ground reference layer 120, 140 or 160 may be adjacent to a signal transmission layer 130, 150, or 170 when the two layers are separated by a layer of dielectric material, but not by another ground reference layer or signal transmission layer. For example, in the PCB 100, ground reference layer 120 may be adjacent to signal transmission layer 130. Similarly, signal transmission layer 130 may be adjacent to ground reference layer 120 and ground reference layer 140.

The signal transmission layers 130, 150, and 170 may include a thin metal layer, most of which is removed by etching, leaving only thin, narrow traces used for signal transmission. The ground reference layers 120, 140, and 160 may also include a thin metal layer, most or all of which remains intact. A plated through-hole, known as a via 180, may be used to provide an electrical connection between a trace on one of the signal transmission layers 130, 150, or 170 of the PCB 100 and a trace on another of the signal transmission layers 130, 150, or 170.

FIGS. 2, 4, 6, and 7 illustrate the ground reference layers 120, 140, and 160, respectively, of a multi-layer PCB 100 in accordance with the teachings of this disclosure. FIGS. 3 and 5 illustrate signal transmission layers 130 and 150, respectively, of a multi-layer PCB 100 in accordance with the teachings of this disclosure.

Figure 2:
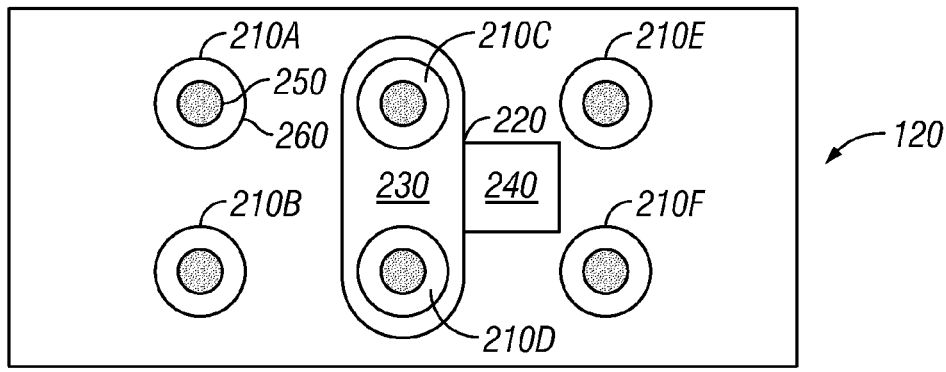
FIG. 2 illustrates a first ground reference layer of a printed circuit board in accordance with one embodiment of the present disclosure.
Figure 3:
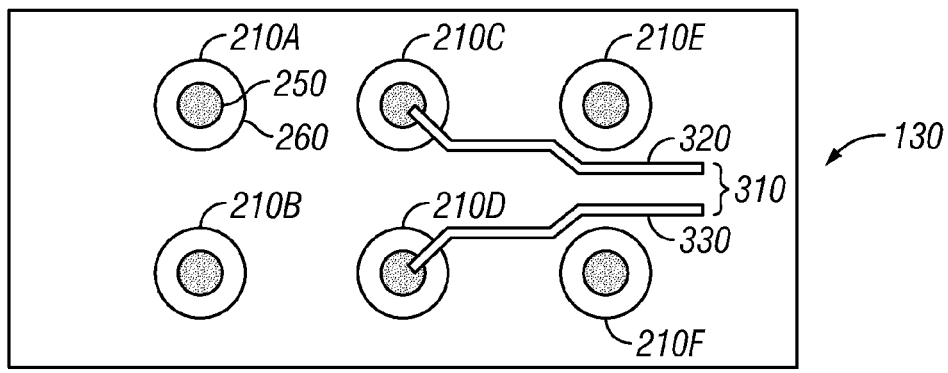
FIG. 3 illustrates a first signal transmission layer of a printed circuit board including a first differential trace in accordance with one embodiment of the present disclosure.

FIG. 2 illustrates a first ground reference layer 120 of a PCB 100. The first ground reference layer 120 may be a metal layer of the PCB 100 that is connected to the PCB's ground point. The first ground reference layer 120 may serve as the return path for current from many different components of the PCB 100.

The first ground reference layer 120 may include vias 210A, 210B, 210C, 210D, 210E, and 210F. Vias 210 are used to provide an electrical connection between a component on one layer of the PCB 100 and a component on another layer. For example, vias 210 may provide an electrical connection between a trace on one signal transmission layer of the PCB and a trace on another signal transmission layer, or they may be used to connect all the ground reference layers in the PCB 100. Vias 210 may include holes 250 through multiple layers of the PCB 100. Vias 210 may be formed by mechanical or laser drilling, or any other suitable means. Additionally, the vias 210 may be made conductive by electroplating or lining the holes with a conductive tube or rivet 260. For example, as shown in FIGS. 2-7, vias 210 may pass through multiple ground reference layers 120, 140, and 160 as well as signal transmission layers 130 and 150. Although FIG. 2 depicts six vias 210, the number of vias included in the PCB 100 may be greater than or less than the number depicted.

Vias 210 may be grouped into differential via pairs 210A and 210B, 210C and 210D, and 210E and 210F. Each differential via pair may be associated with a differential signal trace. A differential signal trace may be a pair of traces used to transmit a single signal, such that each trace transmits half of the differential signal. Similarly, each via in a differential via pair may be used to transmit half of the differential signal.

To prevent an electrical connection between the ground reference layer 120, the vias 210C and 210D, the first ground reference layer 120 may be removed in an area surrounding the vias 210C and 210D. The area surrounding vias 210C and 210D in which the first ground reference layer 120 has been removed is via cutout 220. When a signal changes direction from a trace to a via 210 or from a via 210 to a trace, some of the energy may be stored in a capacitance of the via 210. By enlarging the via cutout 220, the capacitance of the via 210 is reduced, which in turn may reduce the amount of energy that is stored in the capacitance of a via when the signal transitions from a trace to a via 210 or from a via 210 to a trace.

Via cutout 220 may be formed by etching and may include an area 230 surrounding the differential via pair 210C and 210D as well as an extension region 240. Area 230 of via cutout 220 may be oval in shape and centered around the differential via pair 210C and 210D such that the first ground reference layer 120 is removed between vias 210C and 210D and in a radius surrounding vias 210C and 210D. Extension region 240 may extend from the differential via pair 210C and 210D in the direction of the adjacent differential trace, which in this case may be first differential trace 310 (shown in FIG. 3). As discussed above, energy may be stored in the capacitance of the via when a signal transitions from first differential trace 310 to vias 210C and 210D or from vias 210C and 210D to first differential trace 310. By enlarging the via cutout 220 to include extension region 240, the capacitance of the vias 210C and 210D is reduced, which in turn may reduce the amount of energy that is stored in the capacitance of the vias when the signal changes direction as it transitions from vias 210C and 210D to first differential trace 310 or from first differential trace 310 to vias 210C and 210D.

The extension region 240 may extend for a distance to be determined based on the desired performance of the signal transmission in the adjacent differential trace, which in this case may be first differential trace 310 (shown in FIG. 3). For example, the length of the extension region 240 may be determined using a numerical simulation in which the structure of the PCB 100 is modeled and the amount of stored energy is calculated. The length of the extension region 240 may be increased to reduce the amount of energy that is stored.

In some embodiments, extension region 240 may be rectangular in shape. In other embodiments, extension region 240 may be triangular in shape. For example, a triangular extension region 240 may be oriented such that one of the vertices points in the direction of the adjacent differential trace, which in this case may be the first differential trace 310. A triangular shaped extension region 240 may be used to provide a gradual change in capacitance of the first ground reference layer 120 as the signal is transmitted away from differential via pair 210C and 210D.

Additionally, other vias in FIG. 2 may also have cutouts on the first ground reference layer 120 to prevent an electrical connection with the ground. For instance, there may be a cutout on the first ground reference layer 120 around vias 210A and 210B.

Figure 4:
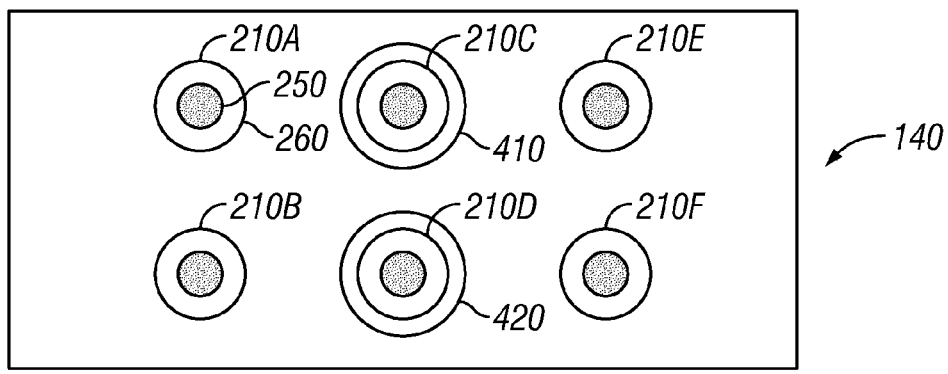
FIG. 4 illustrates a second ground reference layer of a printed circuit board in accordance with one embodiment of the present disclosure.
Figure 5:
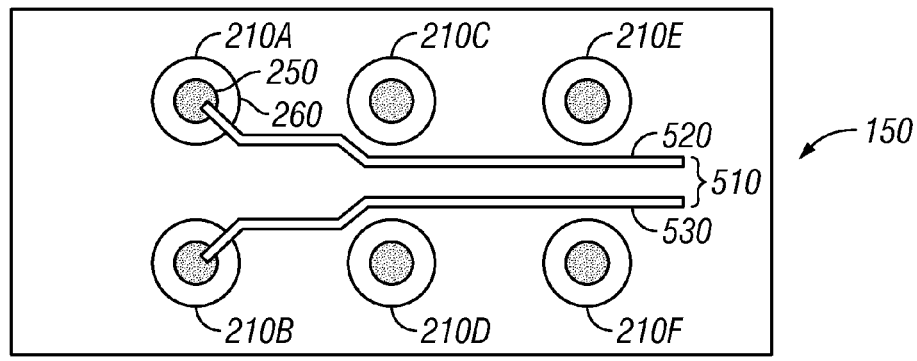
FIG. 5 illustrates a second signal transmission layer of a printed circuit board including a second differential trace in accordance with one embodiment of the present disclosure.

FIG. 3 depicts a first signal transmission layer 130, which may be adjacent to the first ground reference layer 120 (shown in FIGS. 1 and 2) and a second ground reference layer 140 (shown in FIGS. 1 and 4). The first signal transmission layer 130 may include a thin metal layer, most of which may be removed by etching, leaving only the first differential trace 310. In some embodiments, additional traces may be present on signal transmission layer 130. Like the first ground reference layer 120, the first signal transmission layer 130 may include differential via pairs 210A and 210B, 210C and 210D, and 210E and 210F.

The differential trace 310 may be associated with differential via pair 210C and 210D and may include two individual traces 320 and 330. Each individual trace 320 and 330 may be used to transmit half of the differential signal transmitted by the first differential trace 310. Similarly, differential via pair 210C and 210D may be used to transmit the differential signal transmitted by the first differential trace 310, where one half of the signal is transmitted by via 210C and the other half is transmitted by via 210D.

As discussed above, energy may be stored in the capacitance of vias 210C and 210D when a signal transitions from first differential trace 310 to vias 210C and 210D or from vias 210C and 210D to first differential trace 310. To effectively reduce the amount of energy that is stored, the spacing and width of individual traces 320 and 330 may be changed to increase the impedance of the first differential trace 310.

For example, increasing the space between individual traces 320 and 330 may increase the impedance of the first differential trace 310, which may effectively reduce the amount of energy that is stored in the capacitance of vias 210C and 210D when the signal transitions from the first differential trace 310 to vias 210C and 210D. As shown in FIG. 3, the distance between the two individual traces 320 and 330 of the first differential trace 310 may be greater in the area adjacent the extension region 240 than in the area beyond the extension region 240. Although the distance between individual traces 320 and 330 may be greater in the area adjacent the extension region 240 than in the area beyond the extension region 240, the distance between the individual traces 320 and 330 should not be increased to the point that the individual traces 320 and 330 fall outside the footprint of via cutout 220.

Additionally, decreasing the width of the individual traces 320 and 330 may increase the impedance of the first differential trace 310, which in turn may effectively reduce the amount of energy that is stored in the capacitance of vias 210C and 210D when the signal transitions from the first differential trace 310 to vias 210C and 210D.

FIG. 4 illustrates a second ground reference layer 140 adjacent to the first signal transmission layer 130 (shown in FIG. 3) and the second signal transmission layer 150 (shown in FIG. 5). The second ground reference layer 140 may be a metal layer of PCB 100 that is connected to the PCB's ground point. The second ground reference layer 140 may serve as the return path for current from many different components of PCB 100.

Like the first ground reference layer 120 and the first signal transmission layer 130, the second ground reference layer 140 may include differential via pairs 210A and 210B, 210C and 210D, and 210E and 210F. The second ground reference layer 140 may also include a first via cutout 410 associated with via 210C and a second via cutout 420 associated with via 210D. The first via cutout 410 and the second via cutout 420 may be circular in shape and may be centered around vias 210C and 210D respectively.

Typically, ground reference layers include large via cutouts that remove all the metal between a pair of vias. As discussed above, the use of a these large via cutouts may reduce the amount of energy that is stored when the signal transitions from a trace to a via or from a via to a trace. Where a ground reference layer is adjacent two different signal transmission layers, however, the use of a large via cutout may cause an overlap between the via cutout and the trace on an adjacent signal transmission layer. For example, if the via cutout for ground reference layer 140 were as large as via cutout 220 (shown in FIG. 2), the second differential trace 510 (shown in FIG. 5) would overlap the via cutout for the second ground reference layer 140. Such an overlap may create an electrical interaction between the via cutout and the trace, which is referred to as discontinuity.

To avoid an overlap between the via cutout for the second ground reference layer 140 and the second differential trace 510, the radius of the first via cutout 410 and the second via cutout 420 may be selected such that the second ground reference layer 140 remains intact in the area adjacent the second differential trace 510. For example, as shown in FIGS. 4 and 5, the first via cutout 410 and the second via cutout 420 may be sized to permit the second differential trace 510 to pass between the first via cutout 410 and the second via cutout 420. Leaving the ground reference layer 140 intact in the area adjacent the second differential trace 510 may reduce the effect of discontinuity caused by an overlap between a via cutout and a differential trace.

In some embodiments, other vias in FIG. 4 may also have via cutouts on the second ground reference layer 140 to prevent an electrical connection with the ground. For instance, there may be a via cutout on the second ground reference layer 140 around vias 210A and 210B. In some embodiments, the cutout on the second ground reference layer 120 around vias 210A and 210B may be the same as via cutout 620 on the third ground reference layer 160 (shown in FIG. 6).

FIG. 5 illustrates a second signal transmission layer 150 adjacent the second ground reference layer 140 (shown in FIG. 4). The second signal transmission layer 150 may include a thin metal layer, most of which may be removed by etching, leaving only the second differential trace 510. In some embodiments, additional traces may be present on the second signal transmission layer 150. Like the first ground reference layer 120, the first signal transmission layer 130, and the second ground reference layer 140, the second signal transmission layer 150 may include differential via pairs 210A and 210B, 210C and 210D, and 210E and 210F. Additionally, the second signal transmission layer 150 may include a second differential trace 510 associated with differential via pair 210A and 210B. The second differential trace 510 may include two individual traces 520 and 530. Each individual trace 520 and 530 may be used to transmit half of the differential signal transmitted by the second differential trace 510. Similarly, differential via pair 210A and 210B may be used to transmit the differential signal from the second differential trace 510, where one half of the signal is transmitted by via 210A and the other half is transmitted by via 210B.

Energy may be stored in the capacitance of vias 210A and 210B when a signal transitions from the second differential trace 510 to vias 210A and 210B or from vias 210A and 210B to the second differential trace 510. To effectively reduce the amount of energy that is stored, the spacing and width of individual traces 520 and 530 may be changed to increase the impedance of the second differential trace 510. For example, as shown in FIG. 5, the distance between the two individual traces 520 and 530 of the second differential trace 510 may be greater in the area adjacent the extension region 640 (shown in FIG. 6) than in the area beyond the extension region 640. Increasing the space between individual traces 520 and 530 may increase the impedance of the second differential trace 510, which in turn may effectively reduce the amount of energy that is stored in the capacitance of vias 210A and 210B when the signal transitions from the second differential trace 510 to vias 210A and 210B. Although the distance between individual traces 520 and 530 may be greater in the area adjacent the extension region 640 than in the area beyond the extension region 640, the distance between the individual traces 520 and 530 should not be increased to the point that the individual traces 520 and 530 fall outside the footprint of via cutout 620 (shown in FIG. 6).

Additionally, the width of the individual traces 520 and 530 may be narrower in the area beyond the extension region 640 than in the area adjacent the extension region 640. Decreasing the width of the individual traces 520 and 530 may increase the impedance of the second differential trace 510, which in turn may effectively reduce the amount of energy that is stored in the capacitance of vias 210A and 210B when the signal transitions from the first differential trace 510 to vias 210A and 210B.

Figure 6:
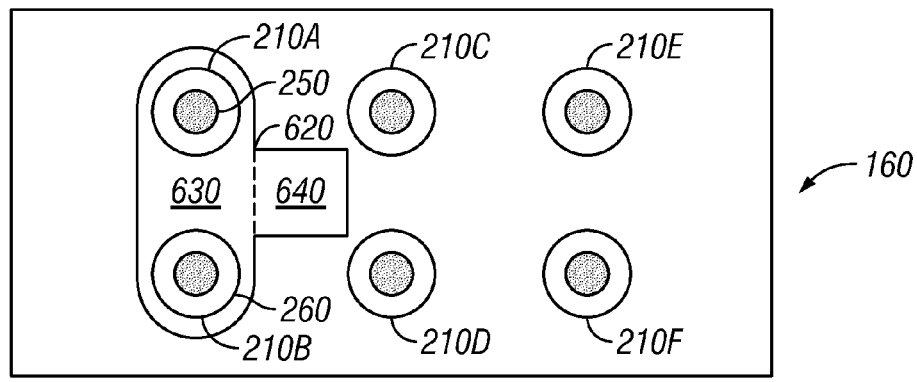
FIG. 6 illustrates a third ground reference layer of a printed circuit board in accordance with one embodiment of the present disclosure.
Figure 7:
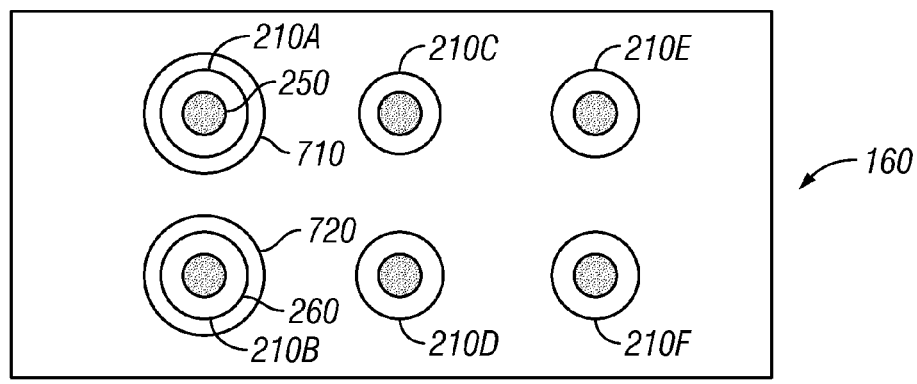
FIG. 7 illustrates a third ground reference layer of a printed circuit board in accordance with one embodiment of the present disclosure.

FIGS. 6 and 7 illustrate alternative embodiments of a third ground reference layer 160 adjacent to the second signal transmission layer 150, which may be employed alternatively based on whether the PCB 100 includes a third signal transmission layer 170 adjacent to the third ground reference layer 160.

FIG. 6 illustrates an embodiment of the third ground reference layer 160 that may be used where the PCB 100 does not include a third signal transmission layer 170 adjacent to the third ground reference layer 160. The third ground reference layer 160 may be a metal layer within a PCB 100 that is connected to the PCB's ground point. The third ground reference layer 160 may serve as the return path for current from many different components on the PCB 100. Like the first ground reference layer 120, the first signal transmission layer 130, the second ground reference layer 140, and the second signal transmission layer 150, the third ground reference layer 160 may include differential via pairs 210A and 210B, 210C and 210D, and 210E and 210F.

To prevent an electrical connection between the ground reference layer 160, the vias 210A and 210B, the third ground reference layer 160 may be removed in an area surrounding the vias 210A and 210B. The area of the third ground reference layer 160 that is removed surrounding vias 210A and 210B is via cutout 620. As discussed above with respect to FIG. 2, when a signal changes direction from a trace to a via 210 or from a via 210 to a trace, some of the energy may be stored in the capacitance of via 210. By enlarging the via cutout 620, the capacitance of vias 210A and 210B is reduced, which in turn may reduce the amount of energy that is stored when the signal transitions from a trace to a via 210 or from a via 210 to a trace.

Via cutout 620 may be formed by etching and may include an area 630 surrounding the differential via pair 210A and 210B as well as an extension region 640. Area 630 of via cutout 620 may be oval in shape and centered around the differential via pair 210A and 210B such that the third ground reference layer 160 is removed between vias 210A and 210B and in a radius surrounding vias 210A and 210B. Extension region 640 may extend from the differential via pair 210A and 210B in the direction of the adjacent differential trace, which in this case may be the second differential trace 510 on the second signal transmission layer 150 (shown in FIG. 5). As discussed above, energy may be stored in the capacitance of the via when a signal transitions from a trace to a via 210 or from a via 210 to a trace. By enlarging the via cutout 620 to include extension region 640, the capacitance of the via pair 210A and 210B is reduced, which in turn may reduce the amount of energy that is stored when the signal changes direction as it transitions from vias 210A and 210B to the second differential trace 510 on the second signal transmission layer 150.

The extension region 640 may extend for a distance to be determined based on the desired performance of the signal transmission in the adjacent differential trace, which in this case may be the second differential trace 510 on the second signal transmission layer 150. For example, the length of the extension region 640 may be determined using a numerical simulation in which the structure of the PCB 100 is modeled and the amount of stored energy is calculated. The length of the extension region 640 may be increased to reduce the amount of energy that is stored.

In some embodiments, extension region 640 may be rectangular in shape. In other embodiments, extension region 640 may be triangular in shape. For example, a triangular extension region 640 may be oriented such that one of the vertices points in the direction of the adjacent differential trace, which in this case may be the second differential trace 510 on the second signal transmission layer 150. A triangular shaped extension region 640 may be used to provide a gradual change in capacitance of the first ground reference layer 160 as the signal is transmitted away from differential via pair 210A and 210B.

In some embodiments, other vias in FIG. 6 may also have via cutouts on the third ground reference layer 160 to prevent an electrical connection with the ground. For instance, there may be a via cutout on the third ground reference layer 160 around vias 210C and 210D.

FIG. 7 illustrates an alternative embodiment of the third ground reference layer 160 that may be used where the PCB 100 includes a third signal transmission layer 170 adjacent the third ground reference layer 160 The third ground reference layer 160 may be a metal layer within a PCB 100 that is connected to the PCB's ground point. The third ground reference layer 160 may serve as the return path for current from many different components on the PCB 100. Like the first ground reference layer 120, the first signal transmission layer 130, the second ground reference layer 140, and the second signal transmission layer 150, the third ground reference layer 160 may include differential via pairs 210A and 210B, 210C and 210D, and 210E and 210F.

The third ground reference layer 160 may also include a first via cutout 710 associated with via 210A and a second via cutout 720 associated with via 210B. The first via cutout 710 and the second via cutout 720 may be circular in shape and may be centered around vias 210A and 210B respectively. To avoid an overlap between via cutouts 710 and 720, and a third differential trace on the third signal transmission layer 170, the radius of the first via cutout 710 and the second via cutout 720 may be selected such that the second ground reference layer 160 remains intact in the area adjacent the third differential trace on the third signal transmission layer 170. As discussed above with respect to FIG. 4, leaving the ground reference layer intact in the area adjacent a differential trace may reduce the effect of discontinuity caused by an overlap between a via cutout and a differential trace.

In some embodiments, other vias in FIG. 7 may also have via cutouts on the third ground reference layer 160 to prevent an electrical connection with the ground. For instance, there may be a via cutout on the third ground reference layer 160 around vias 210C and 210D.

Figure 8:
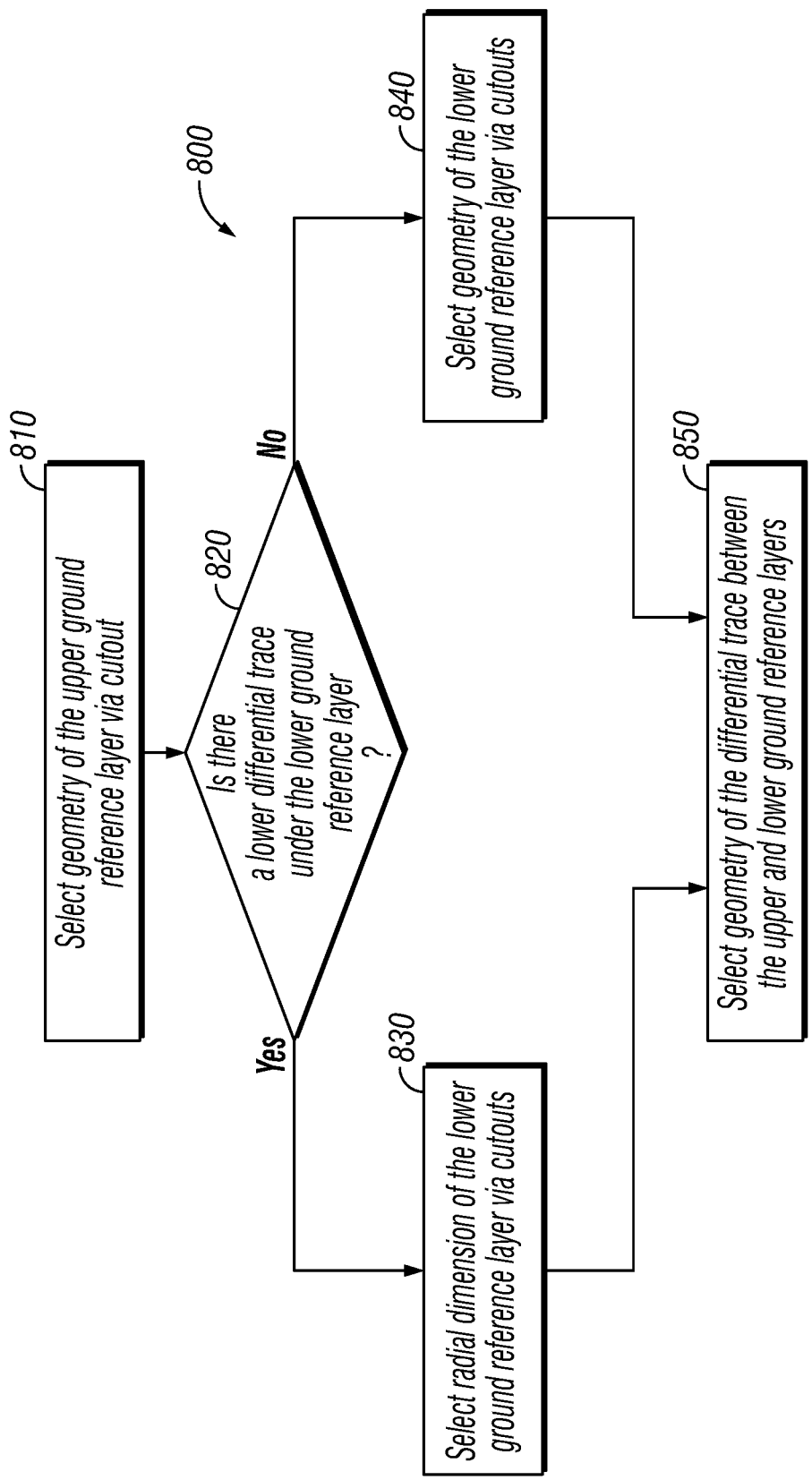
FIG. 8 illustrates a method of optimizing via cutouts on a printed circuit board in accordance with one embodiment of the present disclosure.

FIG. 8 illustrates a method of optimizing via cutouts on a PCB. At step 810, the geometry of a via cutout on the upper ground reference layer may be selected. As described in conjunction with the first ground reference layer in FIG. 2, the via cutout on the upper ground reference layer may include an oval-shaped area surrounding the differential via pair associated with a differential trace and an extension region that extends from the differential via pair in the direction of the adjacent differential trace. The extension region may extend for a distance to be determined based on the desired performance of the signal transmission in the adjacent differential trace.

At step 820, a determination may be made regarding whether the PCB includes a lower differential trace adjacent the lower ground reference layer. Where the PCB includes a lower differential trace adjacent the lower ground reference layer, the method may proceed to step 830. Where the PCB does not include a lower differential trace adjacent the lower ground reference layer, the method may proceed to step 840.

At step 830, the radial dimension of a first and second via cutout on the lower ground reference layer may be selected. As described in conjunction with FIGS. 4 and 7, the lower ground reference layer may include a first via cutout and a second via cutout. Each of the via cutouts may surround one of the vias in the differential via pair associated with the differential trace on the signal transmission layer between the upper and lower ground reference layers. The first via cutout and the second via cutout may be circular in shape and may be centered around one of the vias in the differential via pair. The radius of the first via cutout and the second via cutout may be selected such that the lower ground reference layer remains intact in the area adjacent the lower differential trace. Leaving the ground reference layer intact in the area adjacent the lower differential trace may reduce the effect of discontinuity caused by an overlap between a via cutout and a differential trace.

At step 840, the geometry of a via cutout on the lower ground reference layer may be selected. As described in conjunction with FIG. 6, the via cutout on the lower ground reference layer may include an oval-shaped area and an extension region. The oval-shaped area may surround the differential via pair associated with the differential trace on the signal transmission layer between the upper and lower ground reference layers. The extension region may extend from the differential via pair in the direction of the adjacent differential trace. The extension region may extend for a distance to be determined based on the desired performance of the signal transmission in the adjacent differential trace.

At step 850, the geometry of the differential trace on the signal transmission layer between the upper and lower ground reference layers may be selected. As described in conjunction with FIG. 5, the spacing between the two individual traces of the differential trace may be different in the area adjacent the extension region than in the area beyond the extension region. For example, the spacing between the two individual traces in the area adjacent the extension region may be greater than the spacing between the two individual traces in the area beyond the extension region. Additionally, the width of the individual traces may be different in the area adjacent the extension region than in the area beyond the extension region.

Although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it (or that particular function) is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present invention have been described in detail, it should be understood that the various changes, substitutions, and alterations could be made hereto without departing from the spirit and scope of the invention.

What is claimed is:

1. A printed circuit board comprising:
    a first ground reference layer;
    a second ground reference layer;
    a via cutout on the first ground reference layer, the geometry of the via cutout selected to provide an extension region extending in the direction of a differential trace,
    a first differential trace, the first differential trace adjacent a first ground reference layer and a second ground reference layer, wherein a spacing of the first differential trace in the extension region is different from a spacing of the first differential trace outside the extension region;
    a second differential trace; the second differential trace adjacent the second ground reference layer; and
    a first via cutout and a second via cutout on the second ground reference layer, a radial dimension of the first via cutout and the second via cutout selected such that the second ground reference layer remains intact in the area adjacent the second differential trace.

2. The printed circuit board of claim 1, wherein the spacing of the first differential trace in the extension region is greater than the spacing of the first differential trace outside the extension region.

3. The printed circuit board of claim 1, wherein a width of the first differential trace in the extension region is narrower than a width of the first differential trace outside the extension region.

4. The printed circuit board of claim 1, wherein the extension region is rectangular.

5. The printed circuit board of claim 1, further comprising:
    a third differential trace;
    a third ground reference layer adjacent to and between the second differential trace and the third differential trace,
    a first via cutout and a second via cutout on the third ground reference layer, a radial dimension of the first via cutout and the second via cutout selected such that the third ground reference layer remains intact in the area adjacent the third differential trace.

6. The printed circuit board of claim 1, further comprising:
    a third ground reference layer adjacent to the second differential trace, but not between the second differential trace and a third differential trace:
    a via cutout on the third ground reference layer, the geometry of the via cutout selected to provide an extension region extending in the direction of the second differential trace; and
    wherein a spacing of the second differential trace in the extension region is different from a spacing of the second differential trace outside the extension region.

7. The printed circuit board of claim 6, wherein the spacing of the second differential trace in the extension region is greater than the spacing of the second differential trace outside the extension region.

8. The printed circuit board of claim 6, wherein a width of the second differential trace in the extension region is narrower than a width of the second differential trace outside the extension region.

9. The printed circuit board of claim 6, wherein the extension region is rectangular.

10. A method of optimizing via cutouts, comprising:
    selecting a geometry of a via cutout on a first ground reference layer adjacent to a first differential trace, the geometry of the via cutout selected to provide an extension region extending in the direction of the first differential trace;
    selecting a geometry of the first differential trace, wherein a spacing of the first differential trace in the extension region is different from a spacing of the first differential trace outside the extension region; and
    selecting a radial dimension of a first via cutout and a second via cutout on a second ground reference layer adjacent to and between the first differential trace and a second differential trace, the radial dimension of the first via cutout and the second via cutout selected such that the second ground reference layer remains intact in the area adjacent the second differential trace.

11. The method of claim 10, wherein the spacing of the first differential trace in the extension region is greater than the spacing of the first differential trace outside the extension region.

12. The method of claim 10, wherein a width of the first differential trace in the extension region is narrower than a width of the first differential trace outside the extension region.

13. The method of claim 10, wherein the extension region is rectangular.

14. The method of claim 10, further comprising:
if there is a third ground reference layer adjacent to and between the second differential trace and a third differential trace, selecting a radial dimension of a first via cutout and a second via cutout on the third ground reference layer;
wherein the radial dimension of the first via cutout and the second via cutout is selected such that the third ground reference layer remains intact in the area adjacent the third differential trace.

15. The method of claim 10, further comprising:
if there is a third ground reference layer adjacent to the second differential trace, but not between the second differential trace and a third differential trace:
selecting a geometry of a via cutout on the third ground reference layer, the geometry of the via cutout selected to provide an extension region extending in the direction of the second differential trace; and
selecting a geometry of the second differential trace, wherein a spacing of the second differential trace in the extension region is different from a spacing of the second differential trace outside the extension region.

16. The method of claim 15, wherein the spacing of the second differential trace in the extension region is greater than the spacing of the second differential trace outside the extension region.

17. The method of claim 15, wherein a width of the second differential trace in the extension region is narrower than a width of the second differential trace outside the extension region.

18. The method of claim 15, wherein the extension region is rectangular.

* * * * *